United States Patent
Wang

(10) Patent No.: US 9,773,466 B2
(45) Date of Patent: Sep. 26, 2017

(54) DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Zheng Wang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 347 days.

(21) Appl. No.: 14/389,138

(22) PCT Filed: Oct. 22, 2013

(86) PCT No.: PCT/CN2013/085700
§ 371 (c)(1),
(2) Date: Sep. 29, 2014

(87) PCT Pub. No.: WO2015/014030
PCT Pub. Date: Feb. 5, 2015

(65) Prior Publication Data
US 2016/0358570 A1    Dec. 8, 2016

(30) Foreign Application Priority Data

Jul. 31, 2013  (CN) .......................... 2013 1 0329744

(51) Int. Cl.
*G09G 3/36*        (2006.01)
*G02F 1/1368*      (2006.01)
(Continued)

(52) U.S. Cl.
CPC .......... *G09G 3/3677* (2013.01); *G02F 1/1368* (2013.01); *G02F 1/13306* (2013.01);
(Continued)

(58) Field of Classification Search
CPC .......... G09G 2310/0286; G09G 3/3674; G09G 3/3677; G09G 3/3266; G09G 2300/0408;
(Continued)

(56) References Cited

U.S. PATENT DOCUMENTS 6,346,978 B1 *  2/2002  Hsu .................... G02F 1/1333
                                                 349/138
7,057,598 B2 *  6/2006  Azami ................ G09G 3/3688
                                                 345/100
(Continued)

FOREIGN PATENT DOCUMENTS

CN        101000417 A        7/2007
CN        101140747 A        3/2008
(Continued)

OTHER PUBLICATIONS

Feb. 2, 2016—(WO) International Preliminary Report on Patentability—App PCT/CN2013/085700—Eng Tran.
Dec. 17, 2014 (CN) Office Action—App 201310329744.3 and EngTran.

*Primary Examiner* — Julie Anne Watko
(74) *Attorney, Agent, or Firm* — Banner & Witcoff, Ltd.

(57) ABSTRACT

A display apparatus comprising gate control lines and a plurality of gate driving units, and further comprising a plurality of compensation units (2), wherein each of the compensation units (2) is connected to output terminals of two gate driving units (1) and connected to one of gate control lines. In the display apparatus, the space occupied by gate drivers is reduced and the product size of the display apparatus is decreased by changing the conventional structure of dual gate driving units for two sides to a new structure of a single gate driving unit for two sides (1) plus a compensation unit (2).

12 Claims, 2 Drawing Sheets

(51) Int. Cl.
  *G02F 1/133* (2006.01)
  *G02F 1/1362* (2006.01)
(52) U.S. Cl.
  CPC . *G02F 1/136286* (2013.01); *G09G 2300/043* (2013.01); *G09G 2300/0408* (2013.01); *G09G 2310/08* (2013.01)
(58) Field of Classification Search
  CPC ......... G09G 2300/043; G09G 2310/08; G09G 2300/0404; G09G 2300/04; G09G 2300/00; G09G 2300/0421; G09G 1/1362; G09G 1/136; G09G 1/133; G09G 1/13; G09G 1/01; G09G 1/00; G09G 3/3225; G09G 3/3208; G09G 3/30; G09G 3/22; G09G 3/20; G09G 3/00; G02F 1/13306; G02F 1/136286; G02F 1/1368
  See application file for complete search history.

(56) References Cited

U.S. PATENT DOCUMENTS

| | | | | |
|---|---|---|---|---|
| 7,602,215 | B2* | 10/2009 | Osame | G09G 3/3266 326/46 |
| 7,734,003 | B2 | 6/2010 | Chien et al. | |
| 7,872,629 | B2* | 1/2011 | Edo | G09G 3/20 345/100 |
| 8,018,423 | B2* | 9/2011 | Tsai | G09G 3/3677 345/100 |
| 8,022,971 | B2* | 9/2011 | Choi | G09G 3/3225 341/110 |
| 2006/0098525 | A1* | 5/2006 | Kim | G09G 3/006 365/244 |
| 2007/0171115 | A1 | 7/2007 | Kim et al. | |
| 2008/0062112 | A1* | 3/2008 | Umezaki | G09G 3/342 345/100 |
| 2009/0041177 | A1 | 2/2009 | Chien et al. | |
| 2011/0001752 | A1* | 1/2011 | Ohta | G09G 3/3677 345/530 |
| 2011/0267326 | A1* | 11/2011 | Kim | G09G 3/3677 345/211 |

FOREIGN PATENT DOCUMENTS

| | | |
|---|---|---|
| CN | 201177957 Y | 1/2009 |
| CN | 101409055 A | 4/2009 |
| CN | 101561597 A | 10/2009 |
| CN | 101727859 A | 6/2010 |
| KR | 20060133324 A | 12/2006 |
| TW | M449278 | 3/2013 |

* cited by examiner

DISPLAY APPARATUS

The application is a U.S. National Phase Entry of International Application No. PCT/CN2013/085700, filed on Oct. 22, 2013, designating the United States of America and claiming priority to Chinese Patent Application No. 201310329744.3, filed on Jul. 31, 2013. The present application claims priority to and the benefit of all the above-identified applications and all of the above-identified applications are incorporated by reference herein in their entireties.

TECHNICAL FIELD OF THE DISCLOSURE

The present disclosure relates to the field of display technology, and particularly to a display apparatus.

BACKGROUND

In the design of an existing display apparatus such as a liquid crystal display, gate drivers are typically integrated on an array substrate. For a small size display (usually referring to a display smaller than or equal to 19 inches), a structure of integrating gate drivers on a single side would be employed, that is, the gate drivers are only integrated on one end of the gate control lines of the array substrate. However, for a large size display (usually referring to a display larger than 19 inches), a structure of integrating gate drivers on both sides would be employed, that is, the gate drivers are integrated on both ends of the gate control lines of the array substrate. The reason is that the large size panel has a large size, long wiring and high resolution, and the resulting large load (including large resistance and large parasitic capacitance) would delay the gate signal, such that the delayed gate signal would result in negative effects such as insufficient charging of the pixels, non-uniform pictures, and the like. Therefore, all the large size panels as known employ the design of integrating gate drivers on both sides, that is, identical gate drivers are integrated on both ends of the gate control lines. As shown in FIG. 1, the gate driver comprises a plurality of gate driving units 1, the input terminals of the gate driving units 1 are connected to gate timing sequence signal lines Ck1, Ck2, Ck3 and Ck4 respectively, and the output terminals are connected to the $(n-1)^{th}$, the $n^{th}$, the $(n+1)^{th}$ and the $(n+2)^{th}$ rows of gate control lines respectively to drive the $(n-1)^{th}$, the $n^{th}$, the $(n+1)^{th}$ and the $(n+2)^{th}$ rows of gate control lines respectively. However, such a design makes the gate drivers occupy a large space, and makes the frame of the liquid crystal panel need more space, which affects the product size.

SUMMARY

Embodiments of the present disclosure provide a display apparatus capable of reducing space occupied by gate drivers and reducing the product size.

A display apparatus provided by an embodiment of the present disclosure comprises a plurality of rows of gate control lines and a plurality of gate driving units, and further comprises a plurality of compensation units, and any of the compensation units is connected to the output terminals of two gate driving units and connected to one row of gate control line.

Optionally, the compensation unit comprises a first TFT and a second TFT; the source of the first TFT and the source of the second TFT are connected together and serve as a gate timing sequence signal input terminal of the compensation unit; the drain of the first TFT and the drain of the second TFT are connected together and serve as a driving output terminal of the compensation unit; the gate of the first TFT serves as a first control terminal of the compensation unit; the gate of the second TFT serves as a second control terminal of the compensation unit.

Optionally, the gate timing sequence signal input terminal of the compensation unit is connected to one row of gate timing sequence signal line; the driving output terminal of the compensation unit is connected to one row of gate control line; the first control terminal of the compensation unit is connected to the output terminal of one of the two gate driving units, and the second control terminal of the compensation unit is connected to the output terminal of the other one of the two gate driving units.

Optionally, the gate driving unit and the compensation unit are both integrated on the array substrate of the display apparatus.

Optionally, the display apparatus is a liquid crystal display.

Optionally, both ends of the first row of gate control line and the last row of gate control line of the a plurality of row of gate control lines are connected to gate driving units; except the first row of gate control line and the last row of gate control line, one end of other rows of gate control lines is connected to a compensation unit and the other end is connected to a gate driving unit, and the ends at the same side of two adjacent rows of gate control lines among said other rows of gate control lines are connected to gate driving units and compensation units respectively.

Optionally, the compensation unit connected to one end of any row of gate control line among said other rows of gate control lines is connected to the output terminals of the gate driving units connected to its adjacent previous and next rows of gate control lines, and the compensation unit drives the gate control line connected thereto based on the output of the gate driving units connected to the previous and next rows of gate control lines.

Optionally, among said other rows of gate control lines, the left end of an odd row of gate control line is connected to a gate driving unit, the right end of the odd row of gate control line is connected to a compensation unit, the left end of an even row of gate control line is connected to a compensation unit, and the right end of the even row of gate control line is connected to a gate driving unit.

Optionally, among said other rows of gate control lines, the right end of an odd row of gate control line is connected to a gate driving unit, the left end of the odd row of gate control line is connected to a compensation unit, the right end of an even row of gate control line is connected to a compensation unit, and the left end of the even row of gate control line is connected to a gate driving unit.

According to the display apparatus of embodiments of the present disclosure, the space occupied by gate drivers is dramatically reduced and the product size of the display apparatus is effectively reduced by changing the conventional structure of dual gate driving units for two sides to a new structure of a single gate driving unit for two sides plus a compensation unit.

DETAILED DESCRIPTION

In the following, the present disclosure will be described in detail in connection with the figures and embodiments.

It is noted that, in the description of embodiments of the present disclosure, orientational or positional relations indicated by "up", "down", "left", "right" or the like are the orientational or positional relations shown in the figures, and are only for purpose of simplified descriptions for facilitating the description of embodiments of the present disclosure, not for indicating or implying that the described apparatus or elements must have specific orientations. Therefore, they should be construed to limit the present disclosure.

Figure 1:
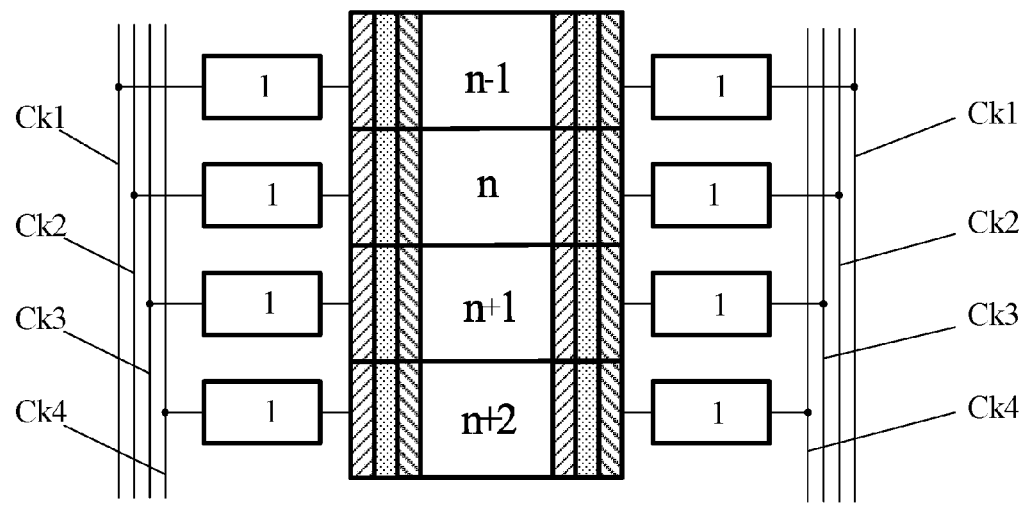
FIG. 1 is a schematic structural diagram for gate driving as known.
Figure 2:
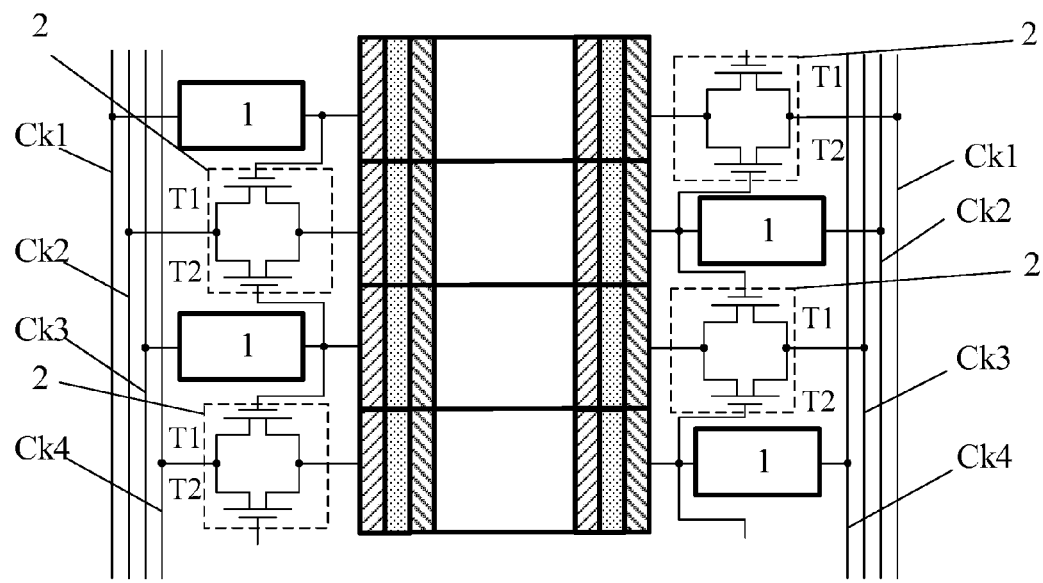
FIG. 2 is a schematic structural connection diagram of a compensation unit of a display apparatus according to an embodiment of the present disclosure.

As shown in FIG. 2, Ck1, Ck2, Ck3 and Ck4 are gate timing sequence signal lines of a display apparatus, and 1 represents gate driving units. The display apparatus provided by an embodiment of the present disclosure comprises gate control lines and multiple gate driving units 1, and further comprises multiple compensation units 2. The compensation unit 2 is connected to the output terminals of two gate driving units 1 and connected to the gate control lines. The compensation unit 2 drives the gate control line connected thereto based on the output signals of the two gate driving units 1 to shift and transfer the gate signals to the gate control line.

The compensation unit 2 comprises a first Thin Film Transistor (TFT) T1 and a second TFT T2; the source of the first TFT T1 is connected to the source of the second TFT T2 and serves as a gate timing sequence signal input terminal of the compensation unit 2; the drain of the first TFT T1 is connected to the drain of the second TFT T2 and serves as a driving output terminal of the compensation unit 2; the gate of the first TFT T1 serves as a first control terminal of the compensation unit 2; the gate of the second TFT T2 serves as a second control terminal of the compensation unit 2. The gate timing sequence signal input terminal of the compensation unit 2 is connected to the gate timing sequence signal line, the driving output terminal of the compensation unit 2 is connected to the gate control line, the first control terminal of the compensation unit 2 is connected to the output terminal of one of the two gate driving units 1, and the second control terminal of the compensation unit 2 is connected to the output terminal of the other one of the two gate driving units 1.

It is noted that, since the source and the drain of the TFT adopted herein are symmetric, the source and the drain thereof are exchangeable. In embodiment of the present disclosure, in order to distinguish the two electrodes other than the gate, one of the two electrodes is referred to as source, and the other electrode is referred to as drain. If the source is adopted as the signal input terminal, the drain is adopted as the signal output terminal, and vice versa.

Typically, the gate driving units 1 and the compensation units 2 are both integrated on the array substrate of the display apparatus. In this case, the size of the array substrate can be reduced effectively likewise.

The display apparatus can be a liquid crystal display or other display apparatus.

Since the compensation unit needs to be connected with two gate driving units for operation, in practice, the display apparatus comprises multiple rows of the gate control lines. Both ends of the first row of gate control line and the last row of gate control line of the multiple rows of gate control lines are connected to a gate driving unit; except for the first row of gate control line and the last row of gate control line, one end of other rows of gate control lines is connected to a compensation unit 2 and the other end is connected to a gate driving unit 1, and the ends at the same side of two adjacent rows of gate control lines among said other rows of gate control lines are connected to gate driving units 1 and compensation units 2 respectively, in other words, the ends at the same side of said other rows of gate control lines are configured to connected with alternate gate driving units 1 and compensation units 2. For example, among said other rows of gate control lines, the left end of an odd row of gate control line is connected to a gate driving unit 1, the right end of the odd row of gate control line is connected to a compensation unit 2, the left end of an even row of gate control line is connected to a compensation unit 2, and the right end of the even row of gate control line is connected to a gate driving unit 1; as an alternative, among said other rows of gate control lines, the right end of the odd row of gate control line is connected to a gate driving unit 1, the left end of the odd row of gate control line is connected to a compensation unit 2, the right end of the even row of gate control line is connected to a compensation unit 2, and the left end of the even row of gate control line is connected to a gate driving unit 1. In the above technical solutions, the compensation unit 2 connected to one end of any row of gate control line among said other rows of gate control lines is connected to the output terminals of the gate driving units 1 connected to the adjacent previous and next rows of gate control lines, and the compensation unit 2 drives the gate control line connected thereto based on the output of the gate driving units 1 connected to the previous and next rows of gate control lines.

In order to better understand embodiments of the present disclosure, the specific structure and the operational principle of a display apparatus according to an embodiment of the present disclosure will be further described by means of one embodiment in the following.

Figure 3:
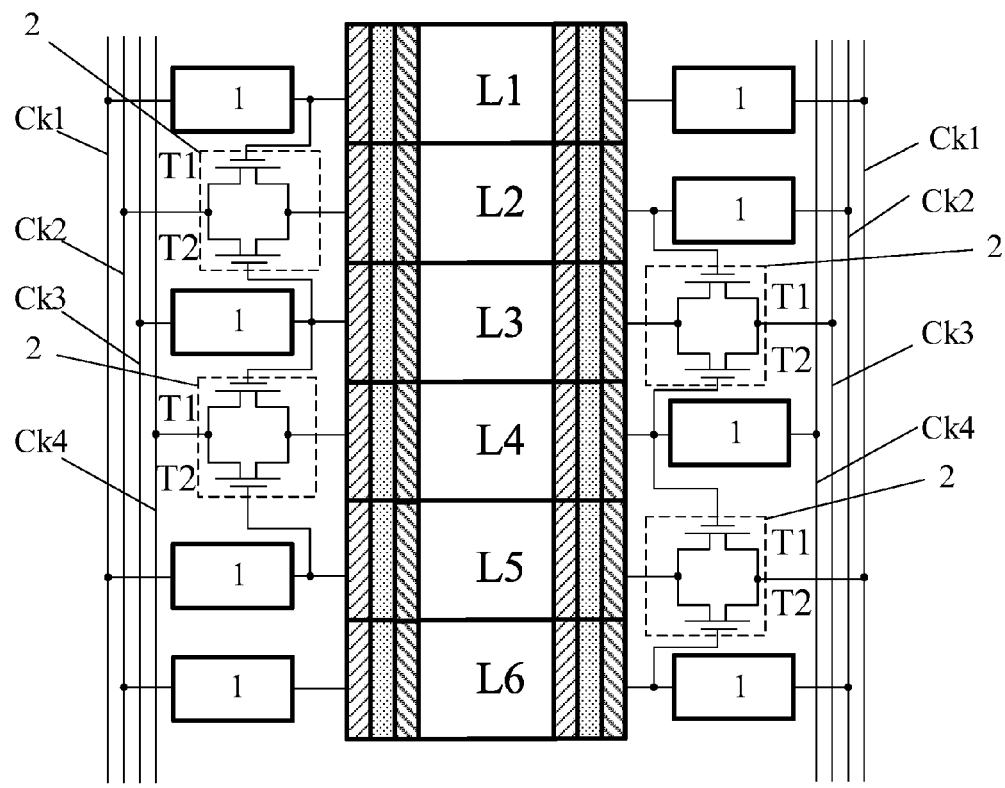
FIG. 3 is a schematic structural diagram of a display apparatus according to an embodiment of the present disclosure.
Figure 4:
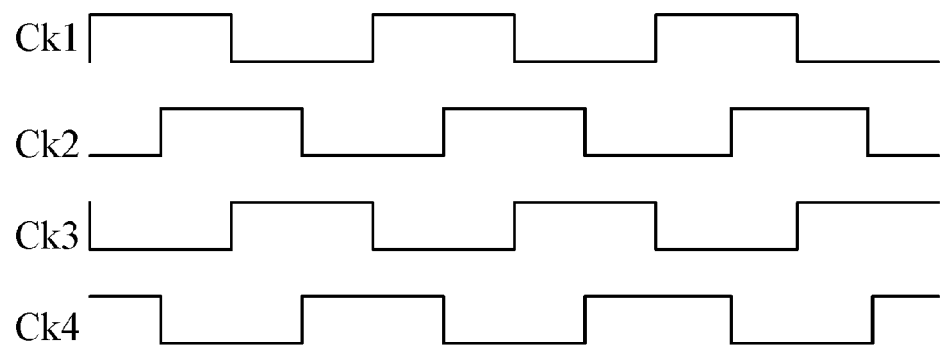
FIG. 4 is a waveform of gate timing sequence signals outputted from gate timing sequence signal lines according to an embodiment of the present disclosure.

As shown in FIG. 3, the display apparatus of the embodiment comprises 6 rows of gate control lines, wherein L1-L6 represent the first to sixth rows of gate control lines respectively, Ck1-Ck4 represent 4 gate timing sequence signal lines respectively. The waveform of the gate timing sequence signals of the gate timing sequence signal lines Ck1, Ck2, Ck3, Ck4 is shown in FIG. 4. Both ends of the first row of gate control line and the sixth row of gate control line among the 6 rows of gate control lines are connected with gate driving units 1; except the first row of gate control line and the sixth row of gate control line, one end of other rows (i.e., rows L2-L5) of gate control lines is connected to a compensation unit 2 and the other end is connected to a gate driving unit 1, and the ends at the same side of two adjacent rows of gate control lines among said other rows (i.e., rows L2-L5) of gate control lines are connected to gate driving units 1 and compensation units 2 respectively. The compensation unit 2 connected to one end of any row of gate control line among said other rows (i.e., rows L2-L5) of gate control lines is connected to the output terminals of the gate driving units 1 connected to the adjacent previous and next rows of gate control lines, and the compensation unit 2 drives the gate control line connected thereto based on the output of the gate driving units 1 connected to the previous and next rows of gate control lines.

The compensation unit 2 comprises a first TFT T1 and a second TFT T2; the source of the first TFT T1 is connected to the source of the second TFT T2 and serves as a gate timing sequence signal input terminal of the compensation unit 2; the drain of the first TFT T1 is connected to the drain of the second TFT T2 and serves as a driving output terminal of the compensation unit 2; the gate of the first TFT T1 serves as a first control terminal of the compensation unit 2; the gate of the second TFT T2 serves as a second control terminal of the compensation unit 2. The gate timing sequence signal input terminal of the compensation unit 2 is connected to a gate timing sequence signal line, the driving output terminal of the compensation unit 2 is connected to the gate control line, the first control terminal of the compensation unit 2 is connected to the output terminal of one of the two gate driving units 1, and the second control terminal of the compensation unit 2 is connected to the output terminal of the other one of the two gate driving units 1.

Now, the operational principle of the compensation unit 2 will be described by taking the compensation unit 2 at the left end of row L2 as an example. As shown in FIG. 3 and FIG. 4, because the gate timing sequence signal input terminal of the compensation unit 2 is connected to the gate timing sequence signal line Ck2 in the second row, the driving output terminal is connected to the second row of gate control line, the first control terminal is connected to the output terminal of the gate driving unit 1 at the left end of the first row, and the second control terminal is connected to the output terminal of the gate driving unit 1 at the left end of the third row, the gate driving unit 1 at the left end of the first row and the gate control unit 1 at the left end of the third row can control the ON/OFF of T1 and T2 alternately, such that Ck2 is connected to the second row of gate control line to drive the second row of gate control line.

In the above embodiments, the space occupied by the gate drivers is dramatically reduced and the product size of the display apparatus is effectively reduced by changing the conventional structure of dual gate driving units 1 for two sides to a new structure of a single gate driving unit 1 for two sides plus a compensation unit 2.

The above descriptions are only for describing the embodiments of the present disclosure, but not for limiting the present disclosure in any way. Those skilled in related arts can make various changes and variations to the embodiments without departing from the spirit and scope of the present disclosure. Therefore, all equivalent technical solutions also belong to the scope of the present disclosure. The protection scope of the present disclosure should be defined by the claims.

What is claimed is:

1. A display apparatus comprising a plurality of rows of gate control lines and a plurality of gate driving units, wherein the display apparatus further comprises a plurality of compensation units, and any one of the compensation units is connected to output terminals of two gate driving units and connected to one row of gate control line;

wherein each of the plurality of compensation units comprises a gate timing sequence signal input terminal, a driving output terminal, a first control terminal and a second control terminal, and the first control terminal is connected to an output terminal of one of the two gate driving units, and the second control terminal is connected to an output terminal of the other of the two gate driving units, wherein each of the plurality of compensation units comprises a first TFT and a second TFT; a source of the first TFT and a source of the second TFT are connected and are configured to serve as the gate timing sequence signal input terminal; a drain of the first TFT and a drain of the second TFT are connected together and are configured to serve as the driving output terminal; the gate of the first TFT is configured to serve as the first control terminal, and the gate of the second TFT is configured to serve as the second control terminal.

2. The display apparatus according to claim 1, wherein the gate timing sequence signal input terminal is connected to one row of gate timing sequence signal line; the driving output terminal is connected to one row of gate control line.

3. The display apparatus according to claim 2, wherein, both ends of a first row of gate control line in the plurality of rows of gate control lines are connected to two gate driving units respectively, and both ends of a last row of gate control line in the plurality of rows of gate control lines are connected to two another gate driving units respectively; except the first row of gate control line and the last row of gate control line, one end of each of other rows of gate control lines is connected to one compensation unit and the other end thereof is connected to one gate driving unit, and the ends at a same side of two adjacent rows of gate control lines among said other rows of gate control lines are connected to one gate driving unit and one compensation unit respectively.

4. The display apparatus according to claim 3, wherein each of the plurality of compensation units is connected to the output terminals of two gate driving units connected to adjacent previous and next rows of gate control lines, and each of the plurality of compensation units is configured to drive the gate control line connected thereto based on outputs of the two gate driving units connected to the previous and next rows of gate control lines.

5. The display apparatus according to claim 3, wherein among said other rows of gate control lines, a left end of an odd row of gate control line is connected to a gate driving unit, a right end of the odd row of gate control line is connected to a compensation unit, a left end of an even row of gate control line is connected to a compensation unit, and a right end of the even row of gate control line is connected to a gate driving unit.

6. The display apparatus according to claim 3, wherein among said other rows of gate control lines, a right end of an odd row of gate control line is connected to a gate driving unit, a left end of the odd row of gate control line is connected to a compensation unit, a right end of an even row of gate control line is connected to a compensation unit, and a left end of the even row of gate control line is connected to a gate driving unit.

7. The display apparatus according to claim 1, wherein each of the plurality of gate driving units and each of the plurality of compensation units are both integrated on an array substrate of the display apparatus.

8. The display apparatus according to claim 1, wherein the display apparatus is a liquid crystal display.

9. The display apparatus according to claim 1, wherein, both ends of a first row of gate control line in the plurality of rows of gate control lines are connected to two gate driving units respectively, and both ends of a last row of gate control line in the plurality of rows of gate control lines are connected to two another gate driving units respectively; except the first row of gate control line and the last row of gate control line, one end of each of other rows of gate control lines is connected to one compensation unit and the other end thereof is connected to one gate driving unit, and the ends at a same side of two adjacent rows of gate control lines among said other rows of gate control lines are connected to one gate driving unit and one compensation unit respectively.

10. The display apparatus according to claim 9, wherein each of the plurality of compensation units is connected to the output terminals of two gate driving units connected to adjacent previous and next rows of gate control lines, and each of the plurality of compensation units is configured to drive the gate control line connected thereto based on outputs of the two gate driving units connected to the previous and next rows of gate control lines.

11. The display apparatus according to claim 9, wherein among said other rows of gate control lines, a left end of an odd row of gate control line is connected to a gate driving unit, a right end of the odd row of gate control line is connected to a compensation unit, a left end of an even row of gate control line is connected to a compensation unit, and a right end of the even row of gate control line is connected to a gate driving unit.

12. The display apparatus according to claim 9, wherein among said other rows of gate control lines, a right end of an odd row of gate control line is connected to a gate driving unit, a left end of the odd row of gate control line is connected to a compensation unit, a right end of an even row of gate control line is connected to a compensation unit, and a left end of the even row of gate control line is connected to a gate driving unit.

* * * * *